(12) United States Patent
Kim et al.

(10) Patent No.: US 9,927,002 B2
(45) Date of Patent: Mar. 27, 2018

(54) FRICTION TRANSMISSION BELT

(71) Applicant: BANDO CHEMICAL INDUSTRIES, LTD., Kobe-shi, Hyogo (JP)

(72) Inventors: Sungjin Kim, Hyogo (JP); Hideaki Kawahara, Hyogo (JP); Osamu Takahashi, Hyogo (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/858,909

(22) Filed: Sep. 18, 2015

(65) Prior Publication Data

US 2016/0010722 A1      Jan. 14, 2016

Related U.S. Application Data

(63) Continuation of application No. PCT/JP2014/000727, filed on Feb. 13, 2014.

(30) Foreign Application Priority Data

Mar. 21, 2013 (JP) ................................. 2013-058664

(51) Int. Cl.
    *F16G 1/10*    (2006.01)
    *F16G 5/08*    (2006.01)
    *F16G 1/28*    (2006.01)
    *F16G 5/20*    (2006.01)
    *F16G 1/12*    (2006.01)
    *F16G 5/10*    (2006.01)
    (Continued)

(52) U.S. Cl.
    CPC ................. *F16G 1/10* (2013.01); *F16G 1/00* (2013.01); *F16G 1/12* (2013.01); *F16G 1/28* (2013.01); *F16G 5/06* (2013.01); *F16G 5/08* (2013.01); *F16G 5/10* (2013.01); *F16G 5/20* (2013.01)

(58) Field of Classification Search
    CPC ...................................... F16G 1/10; F16G 5/08
    USPC ........................................................ 474/202
    See application file for complete search history.

(56) References Cited

U.S. PATENT DOCUMENTS 3,724,284 A * 4/1973 Eng ............................ F16G 5/04
                                                            156/140
3,981,206 A * 9/1976 Miranti, Jr. ........... B29D 29/103
                                                            474/238

(Continued)

FOREIGN PATENT DOCUMENTS

CN         1540183 A      10/2004
JP      55-045784 B2      11/1980

(Continued)

OTHER PUBLICATIONS

International Search Report, dated Mar. 31, 2014, as received in PCT/JP2014/000727.

*Primary Examiner* — William E Dondero
*Assistant Examiner* — Mark K Buse
(74) *Attorney, Agent, or Firm* — Maschoff Brennan

(57) ABSTRACT

A friction transmission belt includes a belt body, formed of a rubber composition, looped over a pulley, and transmitting power. The friction transmission belt includes a reinforcing fabric wrapping at least a surface, of the belt body, in contact with the pulley. The reinforcing fabric is a knitted fabric, and on the surface of the belt body in contact with the pulley, a wale direction of the reinforcing fabric is a direction in which the friction transmission belt travels.

10 Claims, 9 Drawing Sheets

(51) Int. Cl.
*F16G 1/00* (2006.01)
*F16G 5/06* (2006.01)

(56) References Cited

U.S. PATENT DOCUMENTS

| | | | | |
|---|---|---|---|---|
| 4,027,545 A * | 6/1977 | White, Jr. | ............... | B29D 29/10 156/138 |
| 4,518,375 A * | 5/1985 | Mashimo | ............... | B29D 29/00 474/204 |
| 4,604,081 A * | 8/1986 | Mashimo | ................ | F16G 1/28 474/205 |
| 5,171,190 A * | 12/1992 | Fujiwara | ................ | F16G 1/28 139/383 R |
| 5,342,252 A * | 8/1994 | Fujiwara | ................ | F16G 1/28 474/266 |
| 5,529,545 A * | 6/1996 | Isshiki | ................ | F16G 1/28 474/205 |
| 5,616,090 A * | 4/1997 | McGee, Jr. | ............... | D04B 1/22 474/267 |
| 5,645,504 A * | 7/1997 | Westhoff | ................ | F16G 1/28 474/250 |
| 6,159,121 A * | 12/2000 | Di Giacomo | ............. | F16G 1/28 474/205 |
| 6,358,171 B1 * | 3/2002 | Whitfield | ............... | B29D 29/08 474/263 |
| 6,572,505 B1 * | 6/2003 | Knutson | ................ | B29D 29/08 474/260 |
| 6,632,151 B1 * | 10/2003 | Knutson | ................ | B29D 29/08 156/137 |
| 7,749,120 B2 * | 7/2010 | Pelton | ................ | D04B 1/10 474/250 |
| 8,197,372 B2 * | 6/2012 | Wu | ............... | F16G 1/28 474/260 |
| 8,298,665 B2 * | 10/2012 | Wu | ............... | D01F 6/62 428/34.1 |
| 2003/0078125 A1 * | 4/2003 | Knutson | ................ | B29D 29/08 474/260 |
| 2004/0214674 A1 | 10/2004 | Tachibana et al. | | |
| 2005/0003918 A1 * | 1/2005 | Hayashi | ................ | F16G 5/20 474/263 |
| 2008/0108466 A1 * | 5/2008 | Pelton | ................ | D04B 1/10 474/250 |
| 2009/0011883 A1 * | 1/2009 | Wu | ............... | D01F 6/62 474/205 |
| 2010/0173740 A1 * | 7/2010 | Mori | ................ | B29D 29/103 474/252 |
| 2010/0240482 A1 * | 9/2010 | Kanzow | ................ | F16G 5/08 474/237 |
| 2011/0269588 A1 * | 11/2011 | Fleck | ................ | F16G 1/10 474/205 |
| 2012/0115658 A1 * | 5/2012 | Kanzow | ................ | D02G 3/447 474/238 |

FOREIGN PATENT DOCUMENTS

| | | |
|---|---|---|
| JP | 58-175246 U | 11/1983 |
| JP | 62-028340 B2 | 6/1987 |
| JP | 63-242848 A | 10/1988 |
| JP | 01-024610 B2 | 5/1989 |
| JP | 05-272593 A | 10/1993 |
| JP | 11-166596 A | 6/1999 |
| JP | 2000-291743 A | 10/2000 |
| JP | 2001-140988 A | 5/2001 |
| JP | 2003-514206 A | 4/2003 |
| JP | 2004-353806 A | 12/2004 |
| JP | 2009-097701 A | 5/2009 |
| JP | 2010-242825 A | 10/2010 |

* cited by examiner

WALE — A / B; COURSE — C / D

21

22

US 9,927,002 B2

FRICTION TRANSMISSION BELT

CROSS-REFERENCE TO RELATED APPLICATIONS

This is a continuation of International Application No. PCT/JP2014/00727 filed on Feb. 13, 2014, which claims priority to Japanese Patent Application No. 2013-058664 filed on Mar. 21, 2013. The entire disclosures of these applications are incorporated by reference herein.

BACKGROUND

A typical and widely available method known in the art to transmit rotational power of, for example, engines and motors is to secure pulleys on driving and driven shafts, and run power transmission belts, such as V-ribbed belts and V-belts, over the pulleys. When such a power transmission belt is wet while driven, for example, the wet belt produces a known phenomenon called, such as, stick-slip; that is, the power transmission belt and the pulleys slip over each other and generate abnormal noise. Since, this slip noise from the power transmission belt is a cause of abnormal noise generated by a device, various countermeasures to the noise have been studied.

An example of such countermeasures is to wrap the surfaces of V-shaped ribs with a fabric so that, when the V belt and V-ribbed belt are looped over a rib-belt pulley for use, the contact portion between the V-ribbed belt and the rib-belt pulley is maintained low in friction coefficient.

Patent Document 1 (Japanese Unexamined Patent Publication No. 05-272593) discloses, for example, a V-belt and a flat belt whose entire bodies are wrapped with a cylindrical outer wrapping fabric. The document allows for the use of a knit fabric as the outer wrapping fabric of the belts.

Moreover, Patent Document 2 (Japanese Unexamined Patent Publication No. 2000-291743) discloses a power transmission belt with a reinforcing fabric bonded on its belt surface.

Patent Document 3 (Japanese Unexamined Patent Publication No. 2003-514206) discloses a belt having a knit fabric on its back surface.

SUMMARY

The disclosures in Patent Documents 1 to 3, however, are not satisfactory in reducing abnormal noise, and are required to undergo further improvements.

In view of the foregoing background, the present disclosure provides a power transmission belt demonstrating a further improvement in abnormal-noise reduction effect under, for example, a wet condition.

The inventors of the present application conducted various studies to reinforcing fabrics for wrapping the surface of a belt in contact with a pulley. In using knitted fabrics as the reinforcing fabrics, the inventors paid attention to a significant effect resulting from the difference between the front and the back of the knitted fabrics, as well as the difference in their directions (i.e., the wale direction and the course direction). In particular, the inventors found out that the front and back of the knitted fabrics made an unexpectedly significant difference in abnormal noise resistance, and have arrived at the use of this characteristic.

Specifically, a friction transmission belt according to the present disclosure includes a belt body, formed of a rubber composition, looped over a pulley, and transmitting power. The friction transmission belt includes a reinforcing fabric wrapping at least a surface of the belt body in contact with the pulley. The reinforcing fabric is a knitted fabric, and on the surface of the belt body in contact with the pulley, a wale direction of the reinforcing fabric is a direction in which the friction transmission belt travels.

Such a friction transmission belt excels in performances such as wear reduction, wear resistance, and mass-productiveness, and achieves a high abnormal noise reduction effect under, for example, a wet condition.

Moreover, the reinforcing fabric may have a front facing outwardly.

Such a feature allows the friction transmission belt to further excel in performances such as wear reduction, wear resistance, and mass-productiveness.

The friction transmission belt may be a V-ribbed belt having V-shaped ribs provided to an inner circumference of, and extending in a longitudinal direction of, the V-ribbed belt. The reinforcing fabric may wrap surfaces of the V-shaped ribs.

A friction transmission belt according to the present disclosure is also useful as an excellent V-ribbed belt.

The friction transmission belt of the present disclosure achieves excellent effects such as wear reduction, wear resistance, mass-productiveness, and abnormal-noise reduction.

DETAILED DESCRIPTION

An embodiment of the present disclosure will now be described with reference to the drawings.

(V-Ribbed Belt)

Figure 1:
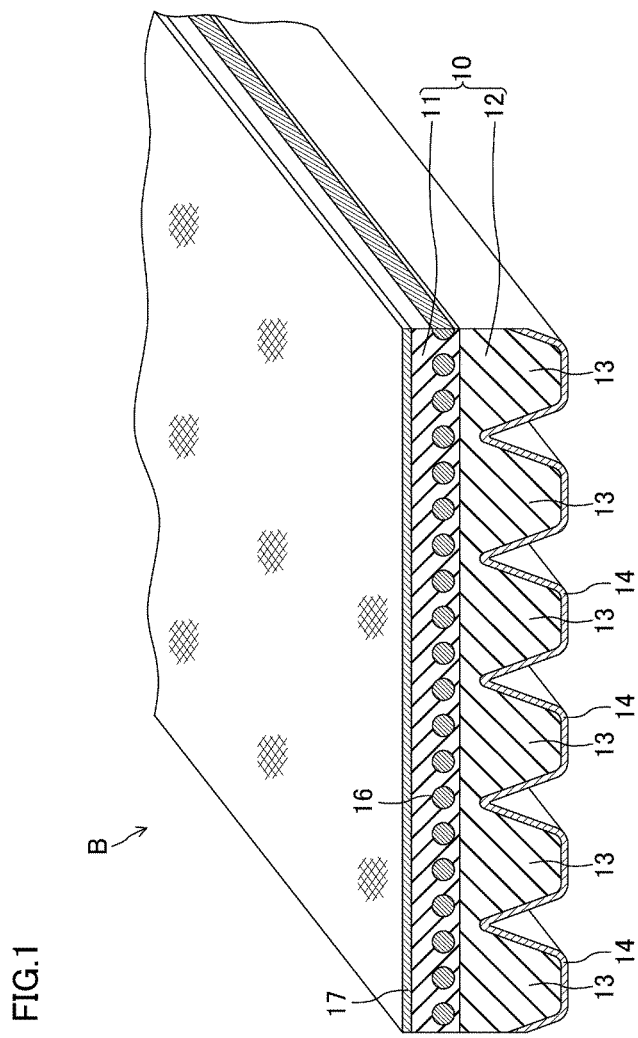
FIG. 1 schematically illustrates an exemplary V-ribbed belt according to the present invention.

FIG. 1 illustrates an exemplary V-ribbed belt B according to this embodiment. This V-ribbed belt B is used for accessory drive belt transmission systems provided in an automotive engine compartment, for example. The V-ribbed belt B is formed to have a belt circumferential length ranging from 700 mm to 3,000 mm, a belt width ranging from 10 mm to 36 mm, and a belt thickness ranging from 4.0 mm to 5.0 mm.

This V-ribbed belt B has a double-layered belt body 10 including an adhesive rubber layer 11 to the outer circumference of the belt, and a compressed rubber layer 12 to the inner circumference of the belt. The belt body 10 has a back surface rubber layer 17 bonded with the surface to the outer circumference of the belt body 10. The belt body 10 has a rib side reinforcing fabric 14 being a knitted fabric and provided to the surface of the belt body 10 to its ribs. Moreover, embedded in the adhesive rubber layer 11 is a cord 16. Each of cords 16 is helical with a pitch in the belt width direction. Described below is each of the constituent elements.

The adhesive rubber layer 11 is formed into a belt of which cross section is horizontally-long quadrilateral. The thickness of the adhesive rubber layer 11 ranges from 1.0 mm to 2.5 mm, for example. The adhesive rubber layer 11 is formed of a rubber composition including a material rubber component containing various compounding ingredients.

Examples of material rubber components for the rubber composition included in the adhesive rubber layer 11 are ethylene-α-olefin elastomer, such as ethylene propylene rubber (EPR) and ethylene-propylene-diene monomer rubber (EPDM), chloroprene rubber (CR), chlorosulfonated polyethylene rubber (CSM), and hydrogenated nitrile butadiene rubber (HNBR). Among these material rubber components, the ethylene-α-olefin elastomer is preferable in view of excellent heat and cold resistance.

Examples of compounding ingredients for the adhesive rubber layer 11 include a crosslinker such as sulfur and an organic peroxide, an antioxidant, a processing aid, a plasticizer, a reinforcing material such as carbon black, and a filler. The rubber composition included in the adhesive rubber layer 11 may contain short fibers. Preferably, however, the rubber composition would rather not contain the short fibers in view of adhesiveness to the cord 16. Note that the rubber composition that forms the adhesive rubber layer 11 is made of an uncrosslinked rubber composition which is a material rubber component mixed with compounding ingredients and kneaded together. The uncrosslinked rubber composition is then heated, pressurized, and crosslinked by a crosslinker to become the rubber composition.

Described next is the cord 16 embedded in the adhesive rubber layer 11. Each cord 16, extending in the longitudinal direction of the belt, is helical with a pitch in the belt width direction. The cord 16 includes twisted yarns 16' made of polyester fibers, polyethylene naphthalate (PEN) fibers, aramid fibers, vinylon fibers, and polyketone fibers. The cord 16 has an outer diameter ranging from 0.7 mm to 1.1 mm, for example. The cord 16 receives an adhesion treatment to provide an adhesive property to the belt body 10. The adhesion treatment involves immersing the cord 16 in an aqueous solution of resorcin/formalin/latex (hereinafter referred to as an RFL aqueous solution) and heating the cord 16 before forming processing. An alternative adhesion treatment, which can be provided together with the former adhesion treatment, involves immersing the cord 16 in rubber cement, and thereafter drying the cord 16.

Described next is the compressed rubber layer 12 having multiple V-shaped ribs 13 protruding toward the inner circumference of the belt. Each of these multiple V-shaped ribs 13 is shaped into a projection having an approximately triangle cross-section, and extending in the longitudinal direction of the belt. Concurrently, these multiple V-shaped ribs 13 are aligned side by side in the belt width direction. Each V-shaped rib 13 has a height ranging from 2.0 mm to 3.0 mm, for example. A width between the base ends of the V-shaped rib 13 ranges from 1.0 mm to 3.6 mm, for example. Moreover, there are 3 to 6 V-shaped ribs 13, for example (in FIG. 1, there are six ribs).

Furthermore, the compressed rubber layer 12 is formed of a rubber composition including a material rubber component containing various compounding ingredients.

Examples of material rubber components for the rubber composition included in the compressed rubber layer 12 are ethylene-α-olefin elastomer, such as ethylene propylene rubber (EPR) and ethylene-propylene-diene monomer rubber (EPDM), chloroprene rubber (CR), chlorosulfonated polyethylene rubber (CSM), and hydrogenated nitrile butadiene rubber (HNBR). Among these material rubber components, the ethylene-α-olefin elastomer is preferable in view of excellent heat and cold resistance.

Examples of compounding ingredients for the compressed rubber layer 12 include a crosslinker such as sulfur and an organic peroxide, an antioxidant, a processing aid, a plasticizer, a reinforcing material such as carbon black, a filler, and short fibers. Note that the rubber composition that forms the compressed rubber layer 12 is made of an uncrosslinked rubber composition which is a material rubber component mixed with compounding ingredients and kneaded together. The uncrosslinked rubber composition is then heated, pressurized, and crosslinked by a crosslinker to become the rubber composition.

Examples of the short fibers mixed with the rubber composition in the compressed rubber layer 12 include nylon shirt fibers, vinylon short fibers, aramid short fibers, polyester short fibers, and cotton short fibers. A short fiber has a length ranging from 0.2 mm to 5.0 mm and a diameter ranging from 10 µm to 50 µm, for example. The short fibers are made of long fibers received, for example, an adhesion treatment in which the long fibers are immersed in an RFL aqueous solution and thereafter heated. The long fibers are then cut along their longitudinal direction into a predetermined length. A portion of the short fibers may be dispersely exposed to the surface of the V-shaped ribs 13. The exposed short fibers may stick out of the surface of the V-shaped ribs 13.

The adhesive rubber layer 11 and the compressed rubber layer 12 may be formed of different rubber compositions, or may be formed of an identical rubber composition.

Next, the back surface rubber layer 17 is formed of a rubber composition including a material rubber component and compounding ingredients similar to those included in the adhesive rubber layer 11. Note that the back surface rubber layer 17 is preferably formed of a rubber composition which is slightly harder than that of the adhesive rubber layer 12 in view of reducing stickiness caused by the contact between the belt back surface and a flat-belt pulley. Moreover, the back surface rubber layer 17 has a thickness ranging from 0.4 mm to 0.8 mm, for example. The surface of the back surface rubber layer 17 preferably has grain of a fabric transferred thereon in view of reducing noise generated by the contact between the belt back surface and a flat-belt pulley.

Note that, instead of the back surface rubber layer 17, a back surface reinforcing fabric may be used. Here, for example, the back surface reinforcing fabric is formed of a fabric material, a knit fabric, and a non-woven fabric, using yarns made of cotton, polyamide fibers, polyester fibers, or aramid fibers. The fabric material is, for example, plain-woven, twilled, or sateen-woven. The back surface reinforcing fabric receives an adhesion treatment to provide an adhesive property to the belt body 10. The adhesion treatment involves immersing the back surface reinforcing fabric in an RFL aqueous solution and heating the fabric before forming processing. An alternative adhesion treatment, which can be provided together with the former adhesion treatment, involves coating the surface of the fabric to the belt body 10 with rubber cement, and drying the surface.

Next, the rib reinforcing fabric 14, wrapping the surface of the belt body 10 to the ribs, is knitted of yarns such as: (i) wooly-finished yarns made of polyamide fibers, polyester fibers, cotton, and nylon fibers which are wooly-finished; or (ii) covered yarns each made of a polyurethanestrerch yarn, serving as a core yarn, covered with a covering yarn.

A fiber surface of the rib reinforcing fabric 14 is coated with an RFL layer. The RFL coat includes a friction coefficient reducing agent dispersed throughout the RFL coat. Examples of the friction coefficient reducing agent include polytetrafluoroethylene (PTFE), tetrafluoroethylene-ethylene copolymer (ETFE), and tetrafluoroethylene-perfluoroalkyl vinyl ether copolymer (PFA). Among these examples, a preferable friction coefficient reducing agent contains polytetrafluoroethylene particles demonstrating the highest effect in friction coefficient reduction.

The RFL coat, including the friction coefficient reducing agent and covering the surface of the rib reinforcing fabric 14, keeps dust and rust from entering the rib reinforcing fabric 14 even if the V-ribbed belt B is used under environments in which dust is found and rust grows. Such an RFL coat makes it possible to keeps the friction coefficient low. As a result, the RFL coat successfully solves problems caused by an increasing friction coefficient, such as early wear of the belt and generation of abnormal noise.

Figure 2A:
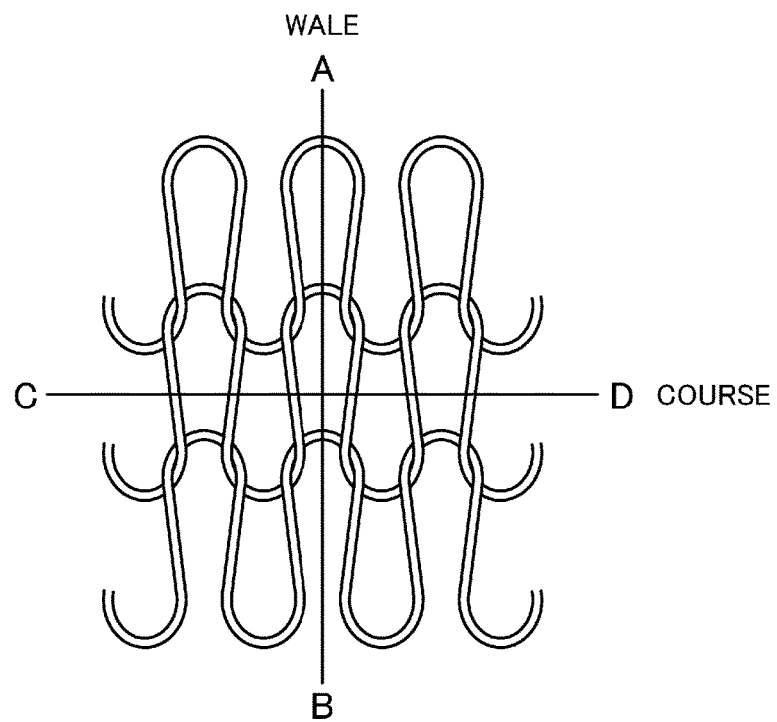
FIGS. 2A to 2C illustrate a structure of a plain-knitted fabric.
Figure 2B:
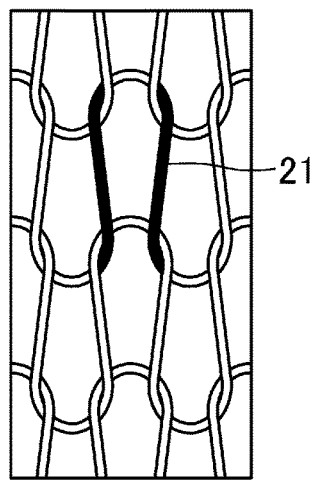
Figure 2C:
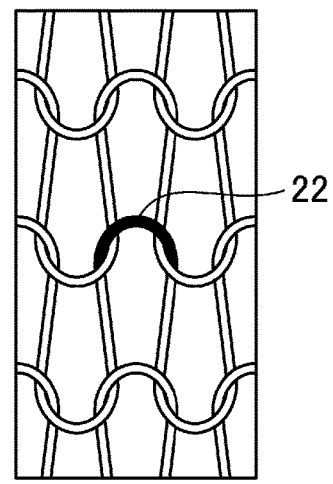

Described here is a plain-knitted fabric; that is, one of the structures of knitted fabrics, with reference to FIGS. 2A to 2C. In the knitting structure illustrated in FIG. 2A, the direction in the line A-B is referred to as a wale direction, and the direction in the line C-D is referred to as a course direction. Moreover, FIG. 2B and FIG. 2C respectively illustrate the front and the back of the plain-knitted fabric. As to the front of the knitted fabric illustrated in FIG. 2B, a portion 21 of yarns extending in the wale direction of the knitted fabric goes over. As to the back of the knitted fabric illustrated in FIG. 2C, a portion 22 of yarns extending in the course direction of the knitted fabric goes over.

The rib reinforcing fabric 14 has a thickness ranging from 0.2 mm to 1.0 mm, for example. The rib reinforcing fabric 14 has a yarn density ranging from 55 to 80 courses per 2.54 mm and from 40 to 70 wales per 2.54 mm.

Here, the rib reinforcing fabric 14 is applied to the surface of the belt body 10 to the ribs so that the front of the rib reinforcing fabric 14 faces outwardly (i.e., so that a viewer of the V-ribbed belt B sees the front of the rib reinforcing fabric 14). Facing the front of the rib reinforcing fabric 14 outwardly is superior in wear reduction, wear resistance, and abnormal noise reduction to facing the back outwardly.

Described below are possible reasons of such superior features.

First, the yarns forming the rib reinforcing fabric 14 are partially embedded in the rubber of the belt body, and only partially stick out of the surface of the belt body. Here, effects such as wear resistance are higher as more yarns are found on the surface.

When the front of the rib reinforcing fabric 14 faces outwardly, the portion 21 sticks out of the belt surface and the portion 22 is embedded in the rubber of the belt. Here, the portion 21 and the portion 22 respectively extend in the wale direction and the course direction of the yarns forming the knitted fabric. As can be seen in FIGS. 2B and 2C, the comparison between the portion 21 extending in the wale direction and the portion 22 extending in the course direction shows that, as a whole, the portion 21, is approximately twice as long as the portion 22. This allows more yarns (i.e., fibers) to be found on the belt surface. Hence, facing the front of the belt outwardly is high in various effects such as wear resistance.

Furthermore, the rib reinforcing fabric 14 is applied to the surface of the belt body 10 to the ribs so that the wale direction is the traveling direction for the V-ribbed belt B. Compared with the course direction of the rib reinforcing fabric 14, in which the belt travels, the wale direction as the belt traveling direction is lower in sliding friction which occurs when the belt comes into contact with a pulley. This contributes to improvements in, for example, wear reduction, wear resistance, and abnormal noise reduction.

The rib reinforcing fabric 14 includes a splicing portion at which the connecting two edges of knitted fabrics are spliced.

Here, the splicing portion is preferably angled with respect to the longitudinal direction of the belt, which improves the durability of the belt. Note that the splicing portion may also be aligned along the longitudinal direction of the belt.

The splicing portion is formed of the connecting edges thermocompression-bonded and fusion-spliced. The splicing portion will be further described later.

As can be seen, the rib reinforcing fabric 14 (i.e., knitted fabric) wraps the surface of the belt body 10 in contact with the pulleys (i.e., the surface to the ribs), while the front of the rib reinforcing fabric 14 faces outwardly and the wale direction is the belt traveling direction. Such features implement a friction transmission belt which excels in, for example, wear reduction, wear resistance, and abnormal noise reduction; that is, the V-ribbed belt B.

Described next is a method for manufacturing this V-ribbed belt B, with reference to FIGS. 3 to 7.

—Preparing Ingredients of Belt Body—

A known method is used to prepare adhesive rubber ingredients 11a' and 11b' for forming the adhesive rubber layer 11 and a compressed rubber ingredient 12' for forming the compressed rubber layer 12. Moreover, a known adhesion treatment is provided to twisted yarns 16' to be the cord 16.

—Preparing Reinforcing Fabric—

Prepared first is a PTFE-including RFL aqueous solution for providing an RFL adhesion treatment to a knitted fabric 14'. The PTFE-including RFL aqueous solution is prepared from a primary condensation product, of resorcin and formalin, mixed with latex, and further with a friction coefficient reducing agent such as polytetrafluoroethylene (i.e., PTFE). The RFL aqueous solution has a solid portion of 10 to 30 percentage by mass, for example. A molar ratio (R/F) of the resorcin (R) to the formalin (F) ranges from one to one to one to two. Examples of the latex include ethylene-propylene-diene monomer rubber latex (EPDM), ethylene-propylene rubber latex (EPR), chloroprene rubber latex (CR), chlorosulfonated polyethylene rubber latex (CSM), and hydrogenated acrylonitrile rubber latex (X-NBR). The mass ratio (RF/L) of the primary condensation product (RF), of the resorcin and formalin, to the latex (L) ranges from one to five to one to twenty. Ten to fifty parts by mass of friction coefficient reducing agent is mixed to 100 parts by mass of the RLF solid portion, for example.

After the knitted fabric 14' is immersed in this RFL aqueous solution, the knitted fabric 14' is heated and dried at 120° C. to 170° C. by a drying oven. The heating and drying depletes the moisture of the RFL aqueous solution and encourages the condensation reaction between the resorcin and the formalin. As a result, an RFL coat is formed to cover the surface of the knitted fabric 14'. Five to thirty parts by mass of RFL is applied to 100 parts by mass of the knitted fabric 14', for example.

After that, the knitted fabric 14', whose surface is covered with the RFL coat, is formed into a cylinder.

To be formed into a cylinder, the knitted fabric 14' is cut into a predetermined length. The knitted fabric 14' is folded and overlapped so that the edges of the fabric 14' are aligned with each other. The aligned edges are placed on an ultrasonic heating apparatus, and a cutter is attached to the ultrasonic heating apparatus above the aligned edges. The ultrasonic heating apparatus then provides vibrations having a high frequency (e.g., ranging from 10 kHz to 30 kHz) to the edges, and thermocompression-bonds the edges. Simultaneously, the thermocompression-bonded portion is cut with the cutter, and the folded knitted fabric 14' is unfolded to form the knitted fabric 14' formed into a cylinder.

How to cut the knitted fabric 14' determines which of the wale direction or the course direction of the knitted fabric 14' corresponds to the belt traveling direction. Moreover, how to fold the knitted fabric 14' determines which of the front or the back of the knitted fabric 14' appears as the outer surface of the V-ribbed belt B. As a matter of course, the knitted fabric 14' can be turned inside out after formed into a cylinder.

Figure 5:
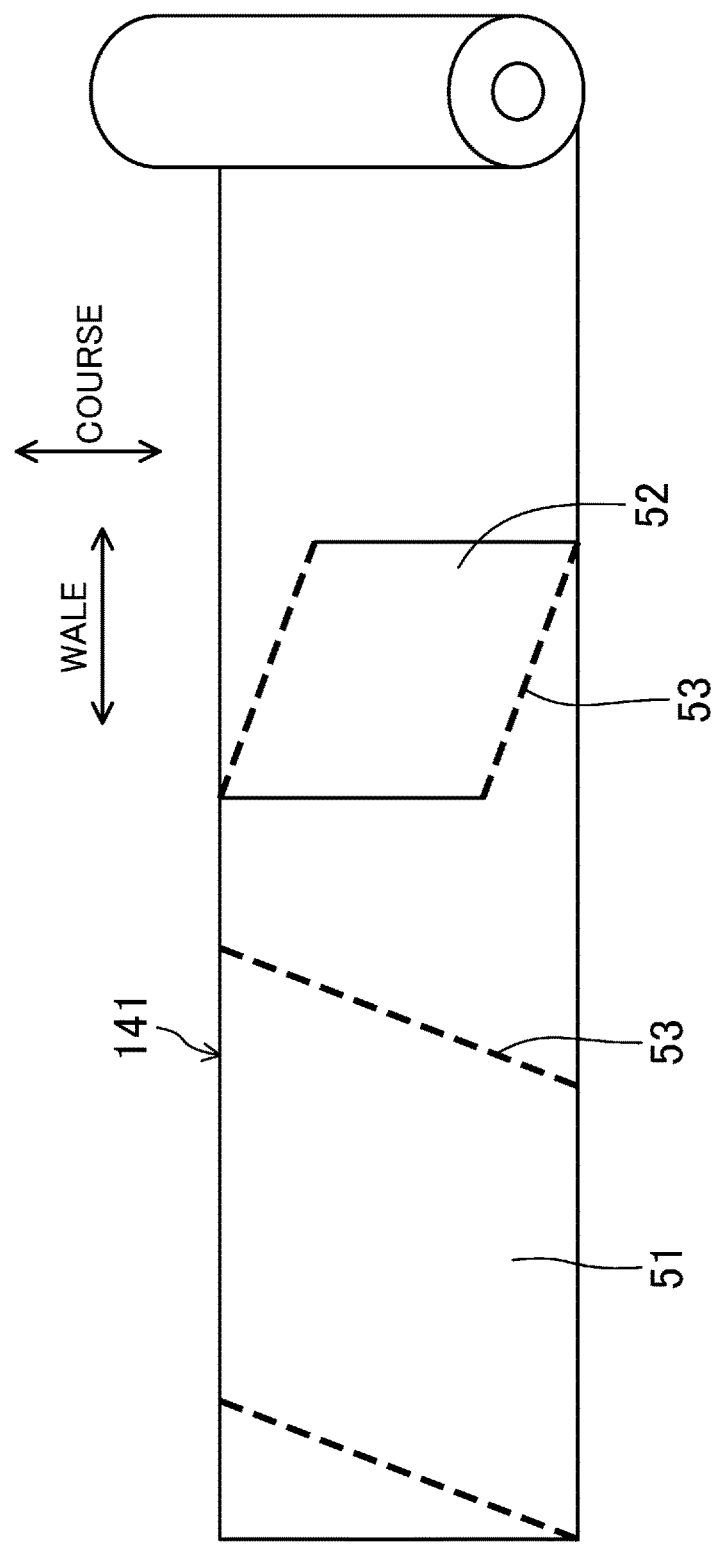
FIG. 5 illustrates a method for cutting a knitted fabric.

FIG. 5 illustrates a method for cutting the knitted fabric 14'. FIG. 5 shows the knitted fabric 14' rolled with the front outward, and a portion of the rolled knitted fabric 14' is unrolled. The back of the knitted fabric 14' appears on the illustration of the unrolled portion, and the front is opposite the back. The front appears on the illustration of the rolled portion. Furthermore, the wale direction and the course direction are respectively the longitudinal direction and the width direction of the knitted fabric 14'.

FIG. 5 illustrates shapes of a knitted fabric 51 for joining in wale direction which is cut to have splicing portions 53 at respective two edges in the wale direction, and a knitted fabric 52 for joining in course direction which is cut to have splicing portions 53 at respective two edges in the course direction. Both the fabrics 51 and 52 are cut into a parallelogram. A parallelogram is preferable since this shape allows for the dispersion of stress imposed on the splicing portions 53 at the tips of the ribs when the belt is used (i.e., when the belt is reversibly bent). As a result, the resistance of the belt to the crack successfully improves.

Figure 6:
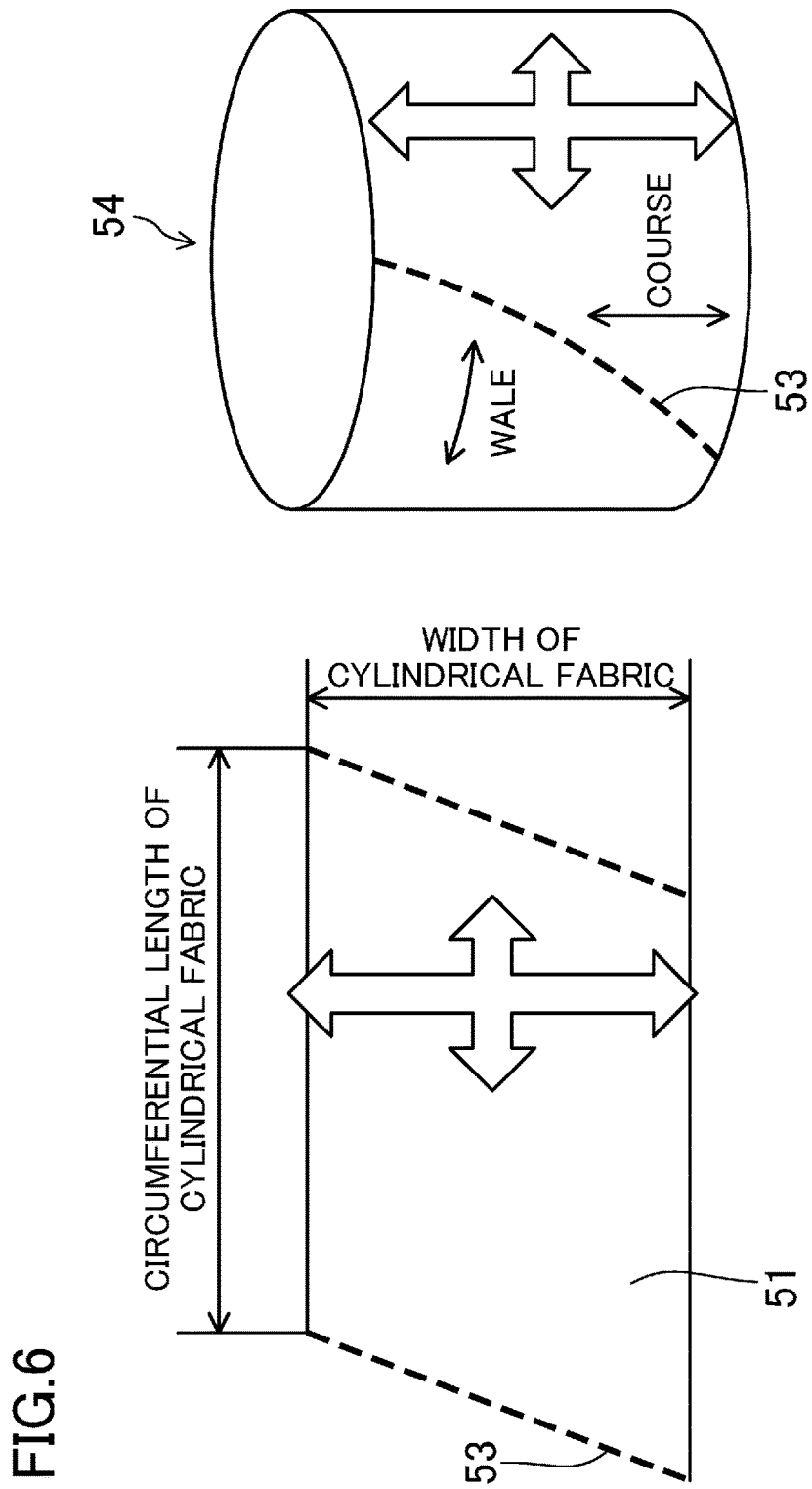
FIG. 6 illustrates a knitted fabric for joining in wale direction, and a cylindrically knitted fabric for joining in wale direction which is a cylindrically-bonded knitted fabric for joining in wale direction.

FIG. 6 illustrates the knitted fabric 51 for joining in wale direction and a cylindrically knitted fabric 54 for joining in wale direction. The splicing portions 53 of the fabric 51 are bonded together so that the fabric 51 is shaped into a cylinder to be the cylindrical fabric 54. Note that the splicing portions 53 may be cut simultaneously when thermocompression-bonded, as described before.

As to the cylindrically knitted fabric 54 for joining in wale direction, the width of the cylindrical fabric 54 is that of the original knitted fabric 14', and the circumferential length of the cylindrical fabric 54 is the distance between the splicing portions 53 in the longitudinal direction of the knitted fabric 14'. Hence, the width of the cylindrical fabric 54 is determined by the width of the knitted fabric 14'. The circumferential length of the cylindrical fabric 54 is set by the distance between the splicing portions 53.

In the case of a plain-knitted fabric, the elasticity of the fabric is greater in the course direction than in the wale direction. As a result, the elasticity of the cylindrical fabric 54 is greater in the width direction than in the circumferential direction. This is illustrated by the lengths of the arrows intersecting crosswise.

Figure 7:
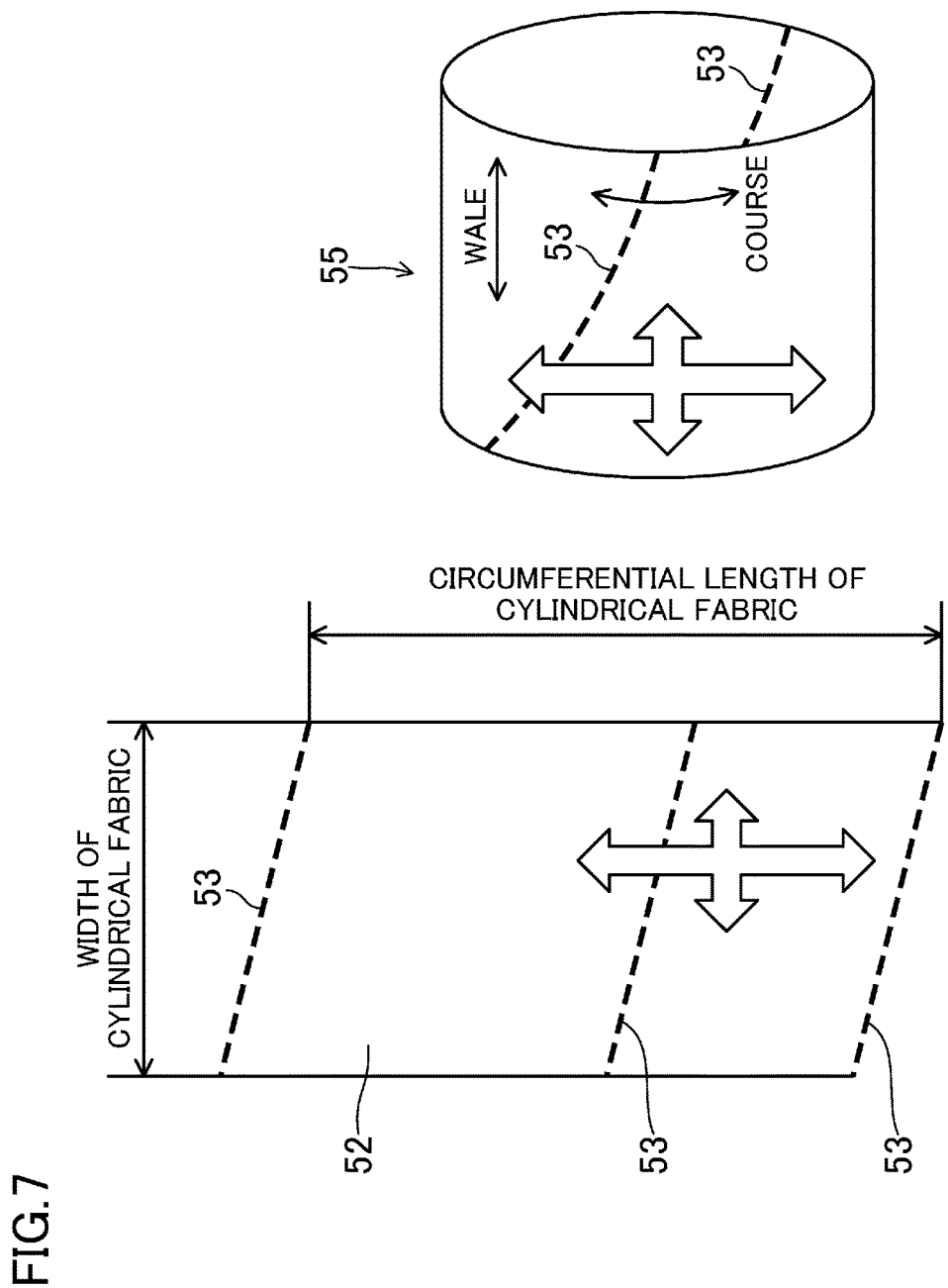
FIG. 7 illustrates a knitted fabric for joining in course direction, and a cylindrically knitted fabric for joining in course direction which is a cylindrically-bonded fabric for joining in course direction.

Moreover, FIG. 7 illustrates the knitted fabric 52 for joining in course direction and a cylindrically knitted fabric 55 for joining in course direction. The splicing portions 53 of the fabric 52 are bonded together so that the fabric 52 is shaped into a cylinder to be the cylindrical fabric 55.

As to the cylindrically knitted fabric 55 for joining in course direction, the width direction of the original knitted fabric 14' is the circumferential direction of the cylindrical fabric 55. Thus, to increase the circumferential length of the cylindrical fabric 55, multiple fabrics 52 are needed to be joined together. In this case, the cylindrical fabric 55 has multiple splicing portions 53 (i.e., two splicing portions in FIG. 7).

As a result, the elasticity of the cylindrical fabric 55 is greater in the circumferential direction than in the width direction because of the difference in elasticity due to the direction of the knitted fabric. This is also illustrated by the lengths of the intersecting arrows.

—Forming V-Ribbed Belt—

Figure 3:
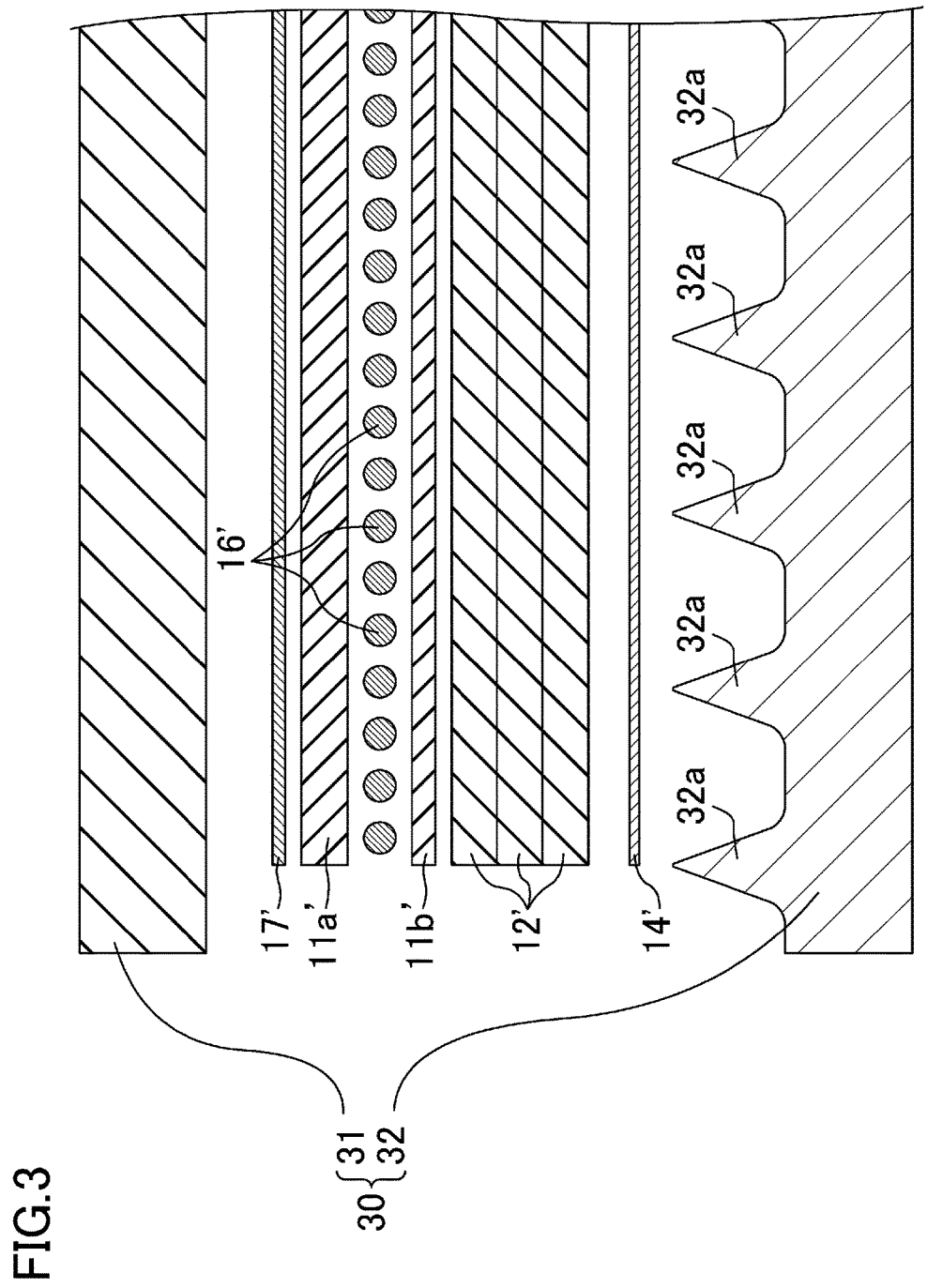
FIG. 3 illustrates a method for manufacturing the V-ribbed belt.
Figure 4:
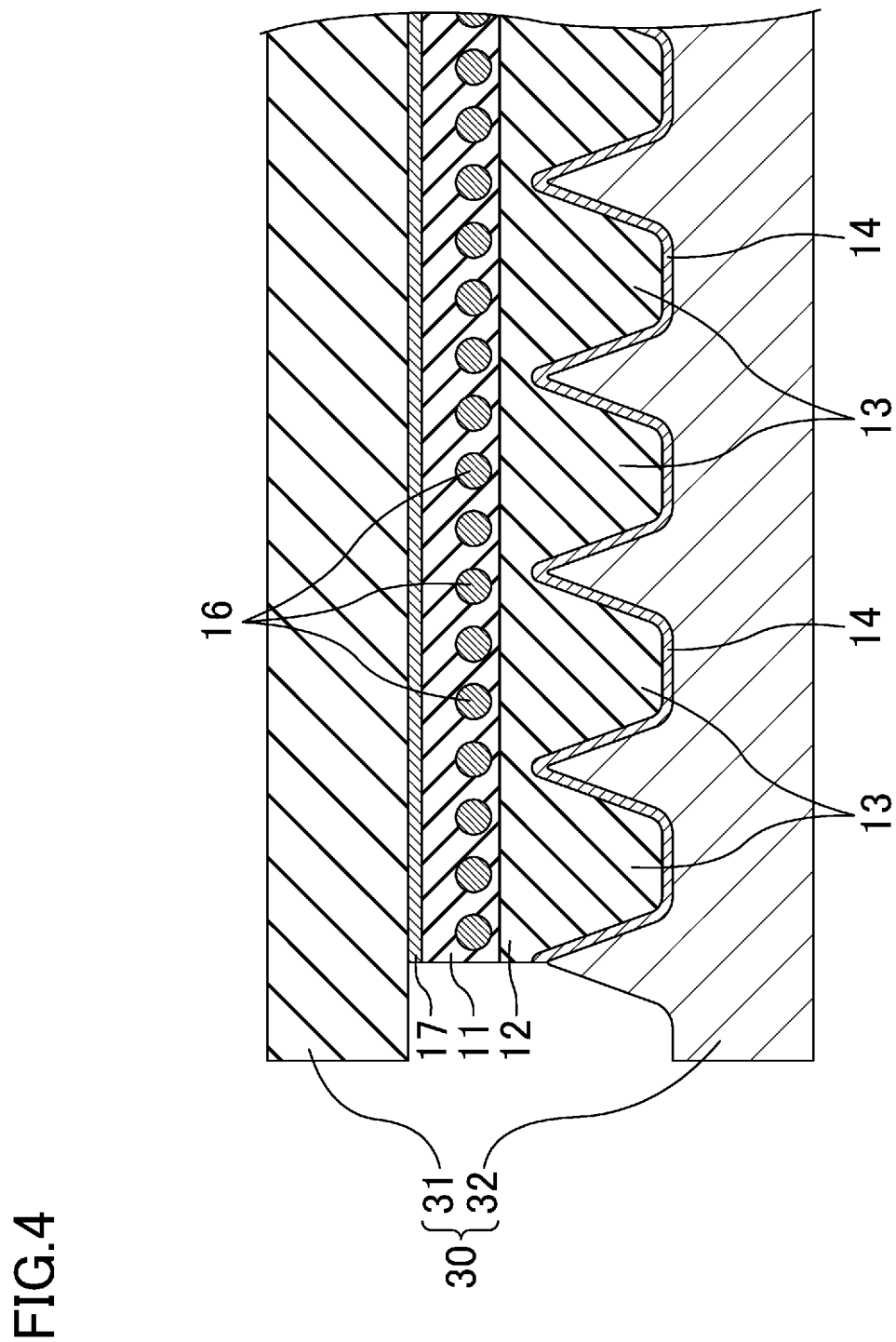
FIG. 4 illustrates a method for manufacturing the V-ribbed belt.

Described next is a method for manufacturing the V-ribbed belt B, with reference to FIGS. 3 and 4.

Used here is a belt forming apparatus 30. The belt forming apparatus 30 includes a rubber sleeve mold 31 shaped into a cylinder, and a cylindrical outer mold 32 fitting to the rubber sleeve mold 31.

The rubber sleeve mold 31 is made of, for example, a flexible material such as acrylic rubber. Using a method such as sending water vapor of a high temperature from inside the rubber sleeve mold 31, the rubber sleeve mold 31 can be inflated radially outward and pressed against the cylindrical outer mold 32. The outer circumference face of the rubber sleeve mold 31 is shaped so that a face to the back surface of the V-ribbed belt B is formed smooth, for example. The rubber sleeve mold 31 has an outer diameter ranging from 700 mm to 2,800 mm, a thickness ranging from 8 mm to 20 mm, and a height ranging from 500 mm to 1,000 mm, for example.

The cylindrical outer mold 32 is made of metal, for example. The inner circumference face of the cylindrical outer mold 32 is provided with ridges 32a extending in the circumferential direction and arranged in the height direction. The ridges 32a are approximately triangular in cross-section to form the V-shaped ribs 13 of the V-ribbed belt B. There are 140 of the ridges 32a arranged in the height direction, for example. The cylindrical outer mold 32 has, for example, an outer diameter ranging from 830 mm to 2,930 mm, an inner diameter (not including the ridges 32a) ranging from 730 mm to 2,830 mm, and a height ranging from 500 mm to 1,000 mm. Each of the ridges 32a has a height ranging from 2.0 mm to 2.5 mm, and a width ranging from 3.5 mm to 3.6 mm.

Materials of the belt are sequentially set to this belt forming apparatus 30. First, a cylindrical rubber sheet 17' to be used as the back surface rubber layer 17 is fitted to the rubber sleeve mold 31. After that, a sheeted adhesive rubber ingredient 11a' is wrapped over the cylindrical rubber sheet 17'. Next, twisted yarns 16' are also wound several times over the adhesive rubber ingredient 11a' to extend in the circumferential direction. Here, the twisted yarns 16' are wound to form a helical pattern having pitches in the height direction of the rubber sleeve mold 31. Next, a sheeted adhesive rubber ingredient 11b' is wrapped over the twisted yarns 16', and, further, a sheeted compressed rubber ingredient 12' is wrapped over the adhesive rubber ingredient 11b'. After that, the knitted fabric 14' formed into a cylinder; that is, the cylindrical fabric 54 or the cylindrical fabric 55, is fitted over the compressed rubber ingredient 12'. Here, as illustrated in FIG. 3, the rubber sheet 17', the adhesive rubber ingredient 11a', the twisted yarns 16', the adhesive rubber ingredient 11b', the compressed rubber ingredient 12', and the knitted fabric 14' are stacked in the stated order from the rubber sleeve mold 31. Moreover, the cylindrical outer mold 32 is attached outward of the belt materials.

Subsequently, with the cylindrical outer mold 32 attached to the rubber sleeve mold 31, water vapor of a high temperature is sent to the rubber sleeve mold 31, for example, to apply heat and pressure to the rubber sleeve mold 31. Thus, the rubber sleeve mold 31 is inflated and pressed against the cylindrical outer mold 32, and the belt materials are sandwiched between the rubber sleeve mold 31 and the cylindrical outer mold 32. At this time, for example, the belt materials have a temperature ranging from 150° C. to 180° C., and receive a pressure ranging from 0.5 MPa to 1.0 MPa in the outward radial direction. Hence, a crosslinking reaction progresses as the rubber compositions flow, and so does the adhesive response of the rubber compositions to the knitted fabric 14' and the twisted yarns 16'. Furthermore, the ridges 32a, provided to the inner circumference face of the cylindrical outer mold 32, form the V-shaped grooves between the V-shaped ribs 13. Here, the cylindrical outer mold 32 serves as a V-shaped-rib-13 forming unit. As can be seen, this is how to form a V-ribbed belt slab (i.e. a belt body precursor).

Finally, the V-ribbed belt slab is cooled and removed from the belt forming apparatus 30. After that, the removed V-ribbed belt slab is sliced in rounds each having a width ranging from, for example, 10.68 mm to 28.48 mm. Each of the sliced rounds is turned inside out. This is how to obtain the V-ribbed belt B.

Note that, in this embodiment, the sheeted adhesive rubber ingredients 11a' and 11b' and the compressed rubber ingredient 12' are wrapped over the rubber sleeve mold 31 to be set. Instead, the sheeted adhesive rubber ingredients 11a' and 11b' and the compressed rubber ingredient 12' may be previously formed into a cylinder to be fitted on the rubber sleeve mold 31 to be set.

Furthermore, as to the belt forming apparatus 30, the inner circumference face of the cylindrical outer mold 32 is described to, but shall not be limited to, have the V-shaped grooves for forming V-shaped ribs 13 of the V-ribbed belt B. For example, the outer circumference face of the rubber sleeve mold 31 may have ridges 32a for forming the V-shaped ribs 13 of the V-ribbed belt B, and the inner circumference face of the cylindrical outer mold 32 may have a smooth surface for forming the back surface of the V-ribbed belt B. In this case, the knitted fabric 14', the compressed rubber ingredient 12', the adhesive rubber ingredient 11b', the twisted yarns 16', the adhesive rubber ingredient 11a', and the rubber sheet 17' are wrapped over the rubber sleeve mold 31 in the stated order.

Note that the described belt and manufacturing method are, but shall not be limited to, a V-ribbed belt and a manufacturing method thereof. Examples of the belt and the manufacturing method include a flat belt and a V-belt, and methods of manufacturing the flat belt and V-belt.

Examples

[Belt for Test and Evaluation]

Four kinds of V-ribbed belt B were prepared here for test and evaluation.

—Preparing Ingredients of Belt Body—

An unvulcanized rubber composition was prepared as an adhesive rubber ingredient for forming an adhesive rubber layer. In the preparation of the unvulcanized rubber composition, the compounding ingredients below were mixed and kneaded together with 100 parts by mass of EPDM (manufactured by JSR Corporation and the trade name of JSR EP123) used as material rubber: 50 parts by mass of carbon black (manufactured by Asahi Carbon Co., Ltd., and the trade name of Asahi #60), 15 parts by mass of plasticizer (manufactured by Japan Sun Oil Co., Ltd., and the trade name of Sunflex 2280), 8 parts by mass of crosslinker (manufactured by NOF corporation and the trade name of PERCUMYL® D), 3 parts by mass of antioxidant (manufactured by Kawaguchi Chemical Industry Co., Ltd., and the trade name of Antage MB), 6 parts by mass of Zinc oxide (manufactured by Sakai Chemical Industry Co., Ltd., and the trade name of Zinc Oxide No. 2), and 1 parts by mass of stearic acid (manufactured by Kao Corporation and the trade name of Stearic Acid). This unvulcanized rubber composition was processed to be a sheet having a thickness of 0.45 mm, using a roll.

Additionally, an unvulcanized rubber composition was prepared as a compressed rubber ingredient for forming a compressed rubber layer. In the preparation of the unvulcanized rubber composition, the compounding ingredients below were mixed and kneaded together with 100 parts by mass of EPDM as material rubber: 55 parts by mass of carbon black, 15 parts by mass of plasticizer, 8 parts by mass of crosslinker, 3 parts by mass of antioxidant, 6 parts by mass of Zinc oxide, and 1 part by mass of stearic acid. This unvulcanized rubber composition was formed into a sheet having a thickness of 0.7 mm, using a roll.

In a similar manner, a sheet to form a back surface rubber layer was prepared of an unvulcanized rubber composition.

Twisted yarns made of polyester fibers were prepared as twisted yarns for making cords. These twisted yarns were immersed in an RFL aqueous solution, heated, and dried.

—Preparing Knitted Fabric—

A knitted fabric to be the rib reinforcing fabric 14 was prepared in the procedure below.

The knitted fabric for use was a plain-knitted fabric, using yarns including urethane elastic yarns covered with 6-nylon yarns. A urethane elastic yarn had a yarn size of 22 denier yarn (i.e., 24.4 dtex), and a 6-nylon yarn had a yarn size of 78 denier yarn (86.7 dtex) and included 52 filaments. Furthermore, the knitted fabric had a knit density of 66 wales per 2.54 cm and 70 courses per 2.54 cm. The knitted fabric had a thickness of 0.52 mm.

Prepared was a PTFE-including RFL aqueous solution for providing an RFL adhesion treatment to this knitted fabric. Specifically, resorcin (R) and formalin (F) are mixed together and stirred with aqueous sodium hydroxide. As a result, an RF primary condensation product (i.e., a molar ratio R/F of 1:1.5) was obtained. The RF primary condensation product was then mixed with VP latex (L) so that the mass ratio (RF/L) became 1:8. Water was then added to the mixture so that the mixture was adjusted to have a solid content concentration of 20%. Furthermore, 30 parts by mass of PTFE (manufactured by Asahi Glass Company, the trade name of Fluon PTFE AD911, the PTFE average particle size of 0.25 μm, and including 60 parts by mass of PTFE) is mixed with 100 parts by mass of the RLF solid portion. The mixture was stirred for 24 hours, and the PTFE-including RFL aqueous solution was prepared. The knitted fabric was immersed in the PTFE-including RFL aqueous solution, and then heated and dried. As a result, an RFL coat was formed on the front of the knitted fabric.

Subsequently, the ends (i.e., the splicing portions 53) of the knitted fabric; that is, the RFL-adhesion treated, were thermocompression-bonded with ultrasonic vibrations (i.e., the frequency of vibrations approximately 80 kHz) applied, and the knitted fabric was formed into a cylinder.

Here, as illustrated in FIGS. 5 to 7, the cylindrical fabric 54 and the cylindrical fabric 55 were produced. Furthermore, prepared for each of the fabrics were a knitted fabric having the front facing outwardly and another knitted fabric having the back facing outwardly.

—Forming V-Ribbed Belt—

The rubber sheet to be used for the back surface rubber layer 17, the uncrosslinked rubber ingredient for forming the adhesive rubber layer, and the twisted yarns were wrapped and wound in the stated order over the rubber sleeve mold 31 of the belt forming apparatus 30. After that, the uncrosslinked rubber ingredient for forming the adhesive rubber layer, the uncrosslinked rubber ingredient for forming the compressed rubber layer, and the cylindrically knitted fabric received the adhesion treatment (i.e., the cylindrically knitted fabric 54 for joining in wale direction or the cylindrically knitted fabric 55 for joining in course direction) were wrapped.

Next, the cylindrical outer mold 32 provided with the V-shaped grooves was fitted to the rubber sleeve mold 31 over the belt materials, inflated, and pressed against the rubber sleeve mold 31. Simultaneously, the rubber sleeve mold 31 was heated with, for example, hot water vapor. Here, a crosslinking reaction progressed as the rubber compositions flowed. In addition, an adhesive response of the twisted yarns and the rib reinforcing fabric to the rubber compositions progressed. Consequently, a cylindrical belt precursor was obtained.

Finally, this belt precursor was removed from the belt forming apparatus 30, and sliced longitudinally into rounds each having either a width of 10.68 mm (i.e., 3 PK: three ribs), or a width of 21.36 mm (i.e., 6 PK: six ribs). Each of the sliced belts was turned inside out, and a V-ribbed belt was obtained. Note that the 6-rib belts were used for an abnormal noise test, and the 3-rib belts were used for a wear resistance test and an adhesive property test. Each belt had a circumferential length of 1,210 mm.

Belts 1 to 4 were prepared for the tests and evaluations (also see Table 1).

When the belt materials, including the cylindrical fabric 54, are wrapped over the rubber sleeve mold 31 with the front of the cylindrical fabric 54 facing outwardly, the cylindrical fabric 54 that covers the working flank of the belt to be produced shows the following: The front faces outwardly, and the wale direction is the traveling direction of the belt. This belt was referred to as Belt 1.

When the belt materials, including the cylindrical fabric 54, are wrapped over the rubber sleeve mold 31 with the back of the cylindrical fabric 54 facing outwardly, the cylindrical fabric 54 that covers the working flank of the belt to be produced shows the following: The back faces outwardly, and the wale direction is the traveling direction of the belt. This belt was referred to as Belt 2.

When the belt materials, including the cylindrical fabric 55, are wrapped over the rubber sleeve mold 31 with the front of the cylindrical fabric 55 facing outwardly, the cylindrical fabric 55 that covers the working flank of the belt to be produced shows the following: The front faces outwardly, and the course direction is the traveling direction of the belt. This belt was referred to as Belt 3.

When the belt materials, including the cylindrical fabric 55, are wrapped over the rubber sleeve mold 31 with the back of the cylindrical fabric 55 facing outwardly, the cylindrical fabric 55 that covers the working flank of the belt to be produced shows the following: The back faces outwardly, and the course direction is the traveling direction of the belt. This belt was referred to as Belt 4.

TABLE 1

| | Knitted Fabric On Working Flank | Abnormal Noise Resistance (hrs) | Adhesive Property (N/3 ribs) | Wear Resistance (%) | Mass-productiveness |
|---|---|---|---|---|---|
| Belt 1 | Wale direction and front | 219 | 20.8 | 0.97 | High |
| Belt 2 | Wale direction and back | 21 | 17.4 | 0.86 | High |
| Belt 3 | Course direction and front | 4 | 13.2 | 0.65 | Low |
| Belt 4 | Course direction and back | 2 | 12.9 | 0.81 | Low |

(Methods for Tests and Evaluations)

<Abnormal Noise Resistance Test>

Figure 8:
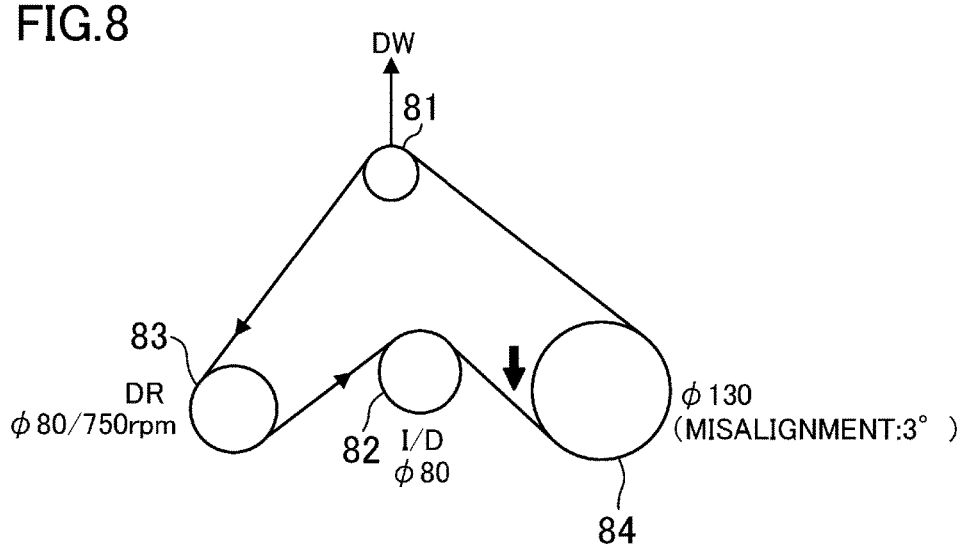
FIG. 8 illustrates a layout of pulleys of a belt running test machine in an abnormal noise test.

FIG. 8 illustrates a layout of pulleys of a belt running test machine 80 conducting an abnormal noise resistance test.

This belt running test machine 80 includes a small-diameter driven rib-belt pulley 81 (i.e., a pulley diameter of 60 mm), an idler pulley 82 (i.e., a pulley diameter of 80 mm), a driving rib-belt pulley 83 (i.e., a pulley diameter of 80 mm), and a large-diameter driven rib-belt pulley 84 (i.e., a pulley diameter of 130 mm). The small-diameter driven rib-belt pulley 81 and the idler pulley 82 are vertically arranged, and the small-diameter driven rib-belt pulley 81 is provided above the idler pulley 82. The driving rib-belt pulley 83 is arranged to the left of the idler pulley 82. The large-diameter driven rib-belt pulley 84 is made from resin and arranged to the right of the idler pulley 82. The V-ribbed belt B is looped over the belt running test machine 80 as follows: V-ribs are in contact with the small-diameter driven rib-belt pulley 81, the driving rib-belt pulley 83, and the large-diameter driven rib-belt pulley 84; and the back surface of the V-ribbed belt B is in contact with the idler pulley 82. As described before, the belts having 6 ribs (6 PK) were used for this test.

Belts 1 to 4 for tests and evaluations were set to the belt running test machine 80. The large-diameter driven rib-belt pulley 84 was offset to the viewer to cause a misalignment due to pulley displacement so that the large-diameter driven rib-belt pulley 84 was misaligned by 3° with respect to the idler pulley 82. Under the ambient temperature of 5° C., the driving rib-belt pulley 83 was rotated counterclockwise at a speed of 750 rpm, and the belts were driven until abnormal noise became audible.

Note that the tension of the belts was set to 267±25N. Moreover, water was fed (i.e. sprayed ten times with a spray gun) once an hour to a portion of the belt which began to enter the large-diameter driven rib-belt pulley 84 (see the arrow).

<Wear Resistance Test>

Figure 9:
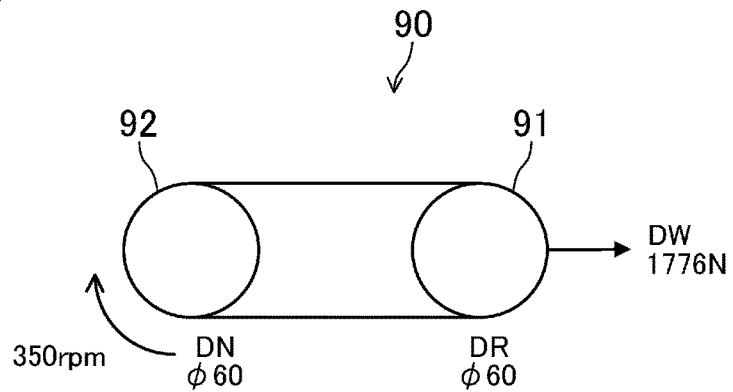
FIG. 9 illustrates a layout of pulleys of a belt running test machine in a wear resistance test.

FIG. 9 illustrates a layout of pulleys of a belt running test machine 90 for evaluating the V-ribbed belt on a wear resistance test. This belt running test machine 90 includes a pair of a driving rib-belt pulley 91 and a driven rib-belt pulley 92. The driving rib-belt pulley 91 and the driven rib-belt pulley 92 are horizontally arranged and each of which has a pulley diameter of 60 mm. Moreover, the belts having three ribs (3 PK) were used for the test.

First, an initial belt mass was weighed for each of the formed Belts 1 to 4 for tests and evaluations. Next, the V-ribbed belt was looped over the driving rib-belt pulley 91 and the driven rib-belt pulley 92 so that the V-ribs were in contact with the pulleys. The driving rib-belt pulley 91 was pulled sideways so that a deadweight of 1,176 N (i.e., 120 kgf) was applied to the driving rib-belt pulley 91, and, simultaneously, a rotational load of 3.8 kW (i.e., 5.2 PS) was applied to the driven rib-belt pulley 92. Each belt underwent a belt running test which involved the driving rib-belt pulley 91 running at a speed of 3,500 rpm for 24 hours under a room temperature. After the test, the mass of each belt was measured so that a mass reduction rate of the belt was calculated to obtain its wear rate.

<Adhesive Property Test for Knitted Fabric>

Figure 10:
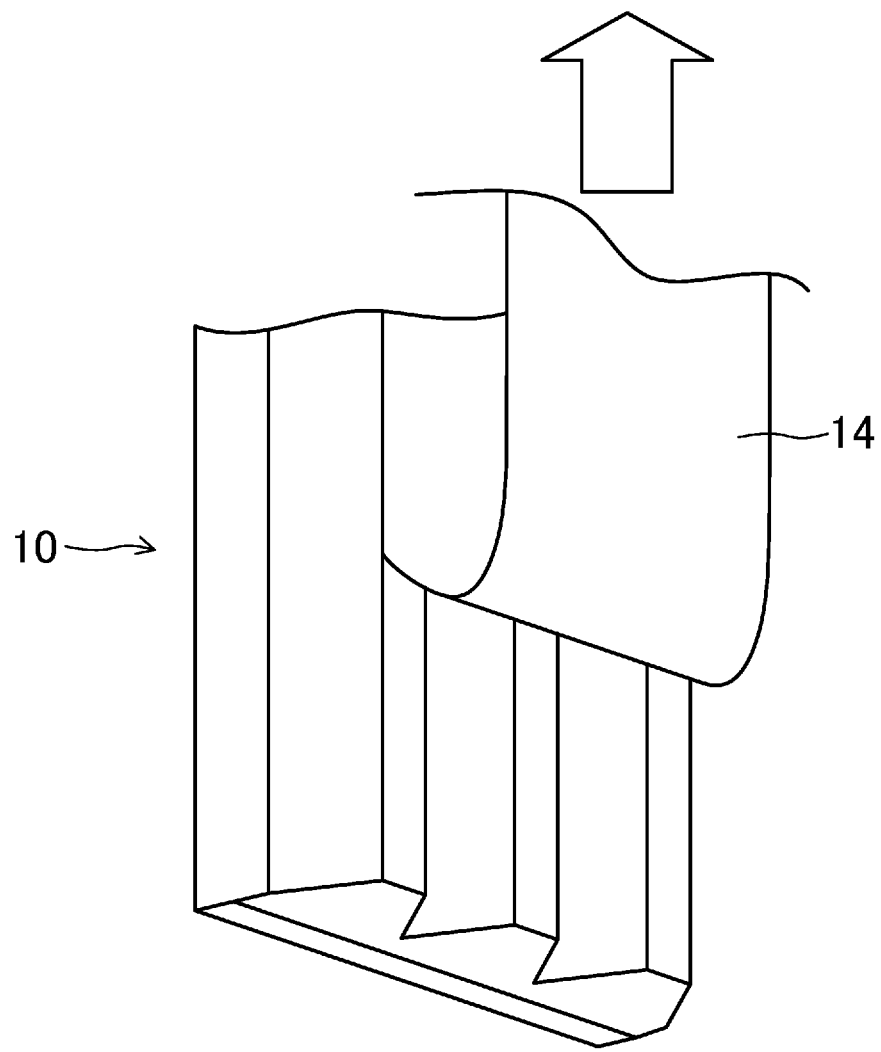
FIG. 10 illustrates a method for testing the adhesive property of a rib side reinforcing fabric to the belt body.

FIG. 10 illustrates how to test the adhesive property of the rib reinforcing fabric 14 to the belt body 10.

The 3-rib belts were used as Belts 1 to 4 for tests and evaluations. Each belt was cut to be a specimen. In cutting the belt, the rib reinforcing fabric 14 was left longer than the belt body 10.

As illustrated in FIG. 10, for each specimen, the belt body 10 was secured and pulling force was applied to the rib reinforcing fabric 14 so that an end of the rib reinforcing fabric 14 in the belt traveling direction (i.e., the vertical direction in FIG. 10) was folded back toward the other end of the rib reinforcing fabric 14 (i.e., the rib reinforcing fabric 14 was folded 180 degrees opposite the direction in which the rib reinforcing fabric 14 was extending). Note that the ambient temperature is a room temperature.

Under the stated conditions, measured was necessary force to remove the rib reinforcing fabric 14 from the belt body 10.

(Results of Tests and Evaluations)

Table 1 shows the following features for each of Belts 1 to 4: the direction (i.e., whether the belt travels in the wale direction or the course direction) of the knitted fabric on the working flank; the back or the front of the knitted fabric to the working flank; the abnormal noise resistance; the adhesive property; the wear resistance; and the mass-productiveness.

Belt 1 clearly excels in abnormal noise resistance. Completely new knowledge acquired here is that the difference between the front and the back of the reinforcing fabric makes the abnormal noise resistance different as great as ten times.

In contrast, Belts 3 and 4 are low in abnormal noise resistance. Belt 2 ranks between Belt 1 and Belts 3 and 4 in terms of performance.

Belt 1 also ranks the highest and Belt 2 is also acceptable in adhesive property. In comparison with Belts 1 and 2, Belts 3 and 4 are low in adhesive property.

As to the wear resistance, Belt 1 wears the most. Belt 3, which travels in the course direction and shows the front outwardly, wears the least. However, all the belts meet the standard.

The mass-productiveness has an influence on the production of the aforementioned cylindrical knitted fabrics. In other words, in the case of the cylindrical fabric 54 of which the circumferential direction may correspond to the longitudinal direction of the knitted fabric 14', the cylindrical fabric 54 may be produced of the knitted fabric 14' bonded together at one spot even if the circumferential length of the cylindrical fabric 54 becomes greater. In contrast, in the case of the cylindrical fabric 55, its circumference direction corresponds to the width direction of the knitted fabric 14'. Hence, multiple knitted fabrics 14' need to be bonded together at multiple spots in order to lengthen the circumference, which leads to an increase in man-hour for production.

Moreover, the both edges in the width direction of the cylindrical fabric 54 may be used as the respective edges of the knitted fabric 14'; however, the both edges in the width direction of the cylindrical fabric 55 are cut ends of the knitted fabric 14'. Hence, the cylindrical fabric 55 might require a process to prevent the cut ends from fraying.

As can be seen, the cylindrical fabric 54 excels in mass-productiveness, and the cylindrical fabric 55 is poor in mass-productiveness even though it can be produced.

Considering the results of the tests and evaluations together, the best belt is Belt 1, which travels in the wale direction of the rib reinforcing fabric 14 and on which the front of the rib reinforcing fabric 14 faces outwardly. Ranked next to the Belt 1 is Belt 2, which travels in the wale direction of the rib reinforcing fabric 14 as Belt 1 does so, and on which the back of the rib reinforcing fabric 14 faces outwardly.

As to Belts 3 and 4, which travel in the course direction of the rib reinforcing fabric 14, Belt 3 on which the front of the reinforcing fabric faces outwardly is superior to Belt 4 in all of the abnormal noise resistance, adhesive property, and wear resistance.

As can be seen, when a knitted fabric is used as the rib reinforcing fabric of a belt, the belt will significantly excel in performances such as abnormal noise resistance in the cases where the front of the knitted fabric faces outwardly for use, as well as where the belt travels in the wale direction.

A friction transmission belt according to the present disclosure excels in performances such as wear reduction, wear resistance, and mass-productiveness, and achieves a high abnormal noise reduction effect under a wet condition. The friction transmission belt is useful for devices such as accessory drive belt transmission systems for cars.

What is claimed is:

1. A friction transmission belt including a belt body formed of a rubber composition, looped over a plurality of pulleys, and transmitting power, the friction transmission belt comprising:
   a reinforcing fabric configured to wrap at least a surface of the belt body in contact with the plurality of pulleys, the reinforcing fabric being a weft-knitted fabric, wherein
   on the surface of the belt body in contact with the plurality of pulleys, a wale direction of the reinforcing fabric is a direction in which the friction transmission belt travels,
   the reinforcing fabric is weft-knitted, and
   yarns included in the reinforcing fabric have a portion embedded in the rubber composition included in the belt body, and
   the yarns have a portion sticking out of the surface of the belt body, and extending in the wale direction of the reinforcing fabric.

2. The friction transmission belt of claim 1,
   the friction transmission belt being a V-ribbed belt having V-shaped ribs provided to an inner circumference of, and extending in a longitudinal direction of, the V-ribbed belt, wherein
   the reinforcing fabric is configured to wrap surfaces of the V-shaped ribs.

3. The friction transmission belt of claim 1, wherein the reinforcing fabric is plain-knitted.

4. The friction transmission belt of claim 3, wherein
the reinforcing fabric, which is plain-knitted, has a back
  in contact with the belt body.

5. The friction transmission belt of claim 1, wherein
the reinforcing fabric is knitted of wooly-finished yarns
  made of polyamide fibers, polyester fibers, cotton, or
  nylon fibers.

6. The friction transmission belt of claim 1, wherein
the reinforcing fabric is knitted of covered yarns each
  made of a polyurethane stretch yarn, serving as a core
  yarn, covered with a covering yarn.

7. The friction transmission belt of claim 1, wherein
a fiber surface of the reinforcing fabric is coated with a
  Resorcinol Formaldehyde Latex (RFL) coat including a
  friction coefficient reducing agent dispersed throughout
  the RFL coat.

8. The friction transmission belt of claim 1, wherein
at least a portion of the reinforcing fabric is embedded in
  the rubber composition included in the belt body.

9. The friction transmission belt of claim 1, further comprising
  a back surface rubber layer formed of a rubber composition and provided to a back surface of the belt body.

10. The friction transmission belt of claim 1, further comprising
  a back surface reinforcing fabric covering a back surface of the belt body, the back surface reinforcing fabric being different from the reinforcing fabric.

* * * * *